Patented Apr. 22, 1924.

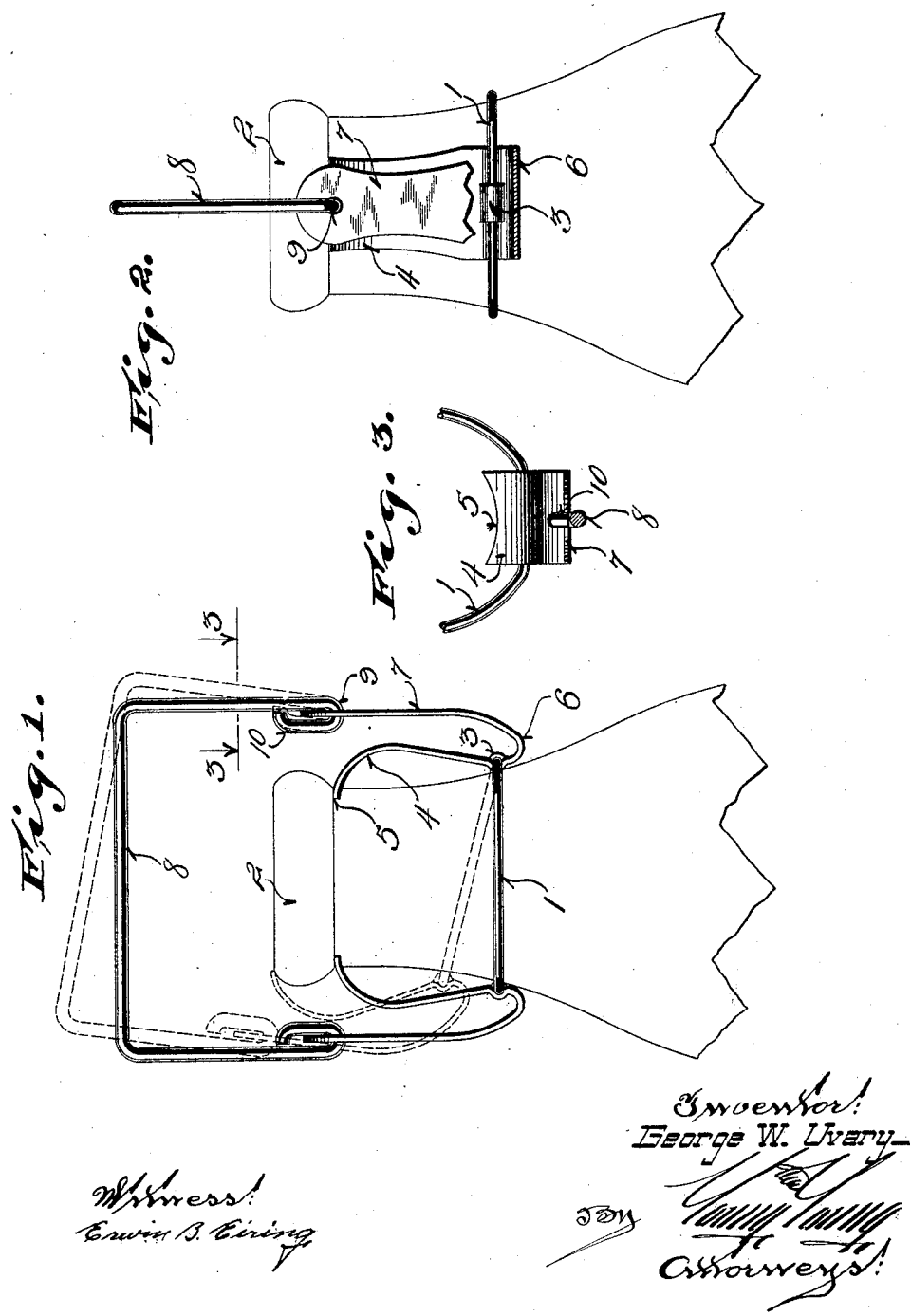

1,491,118

UNITED STATES PATENT OFFICE.

GEORGE W. UVARY, OF MANITOWOC, WISCONSIN.

BOTTLE CARRIER.

Application filed May 17, 1923. Serial No. 639,501.

*To all whom it may concern:*

Be it known that I, GEORGE W. UVARY, a citizen of the United States, and resident of Manitowoc, in the county of Manitowoc and State of Wisconsin, have invented certain new and useful Improvements in Bottle Carriers; and I do hereby declare that the following is a full, clear, and exact description thereof.

This invention relates to bottle carriers, and is particularly directed to a milk bottle carrier.

Objects of this invention are to provide a carrier for a bottle, such as the usual milk bottle, provided with an upper beaded edge which is so organized that it may most readily be positioned upon and removed from such bottle by the simple manipulation of the handle, which is adapted to engage such upper beaded edge in a resilient and secure manner, and which, when so engaged, cannot be inadvertently detached therefrom.

Further objects are to provide a device for carrying milk bottles which is of extremely simple construction, which may be most readily manipulated, and which may be cheaply constructed.

An embodiment of the invention is shown in the accompanying drawings, in which:

Figure 1 is a side view of the apparatus showing in full line the position it occupies upon a bottle and in dotted lines the position it assumes during the attaching or detaching operation.

Figure 2 is an end view of the structure shown in Figure 1, with parts broken away for clearness.

Figure 3 is a fragmentary view corresponding roughly to a section on the line 3—3 of Figure 1, showing a portion of the device detached from the bottle.

The milk bottle carrier comprises a ring 1 which is of such size that it may freely slip over the beaded upper end of a bottle, such as a milk bottle. Upon this ring a pair of opposed, relatively stiff, spring members are pivotally mounted, as indicated at 3. These members are provided with upwardly and inwardly curved arms 4 which are provided at their inner ends with curved gripping faces 5 (see Figure 3) adapted to engage the bottle immediately beneath the bead 2. These members are curved adjacent their lower ends, as indicated at 6, and extend upwardly to provide arms 7.

A relatively stiff wire handle 8 is formed in a rectangular or U-shape and has its ends projected through apertures 9 formed in the arm 7 and turned upwardly and inwardly to form a rigid loop 10 to loosely position the handle relatively to the arm 7.

In using the device, the bottle is held in one hand and the handle in the other hand of the operator. The ring 1 is then slipped over the neck of the bottle by manipulating the handle so as to cause one of the arms 4 to be advanced below the other corresponding arm, as shown in dotted lines in Figure 1. This is readily secured by tilting the handle, as indicated. Thereafter, the elevated arm is forced downwardly by pressing upon that side of the handle—the curved portion of the arm readily riding over the beaded edge 2 and snapping over such beaded edge.

Obviously the detaching operation is performed by executing these movements in their reverse order, that is to say, the handle is pushed sidewise and tilted upwardly to carry one of the arms 4 clear of the bead 2. Thereafter the device may be readily slipped from the neck of the bottle.

It will thus be seen that a bottle carrier has been provided which is of extremely simple design, which is effective in operation, which may be most readily attached and detached, and which will not inadvertently loosen its grip upon the bottle.

I claim:—

1. A bottle carrier comprising a ring adapted to loosely encircle the neck of a beaded bottle, a pair of spring arms pivotally carried by said ring and adapted to engage the neck of the bottle below the bead, and a U-shaped handle having its ends pivotally joined to said spring member.

2. A carrier for a bottle having an upper bead upon its neck, said carrier comprising a ring adapted to loosely slip over the neck of the bottle, a pair of inwardly curved spring members adapted to grip the neck of the bottle below said bead and pivotally carried by said ring, said members having upwardly extending spaced arms, and a U-shaped handle pivotally joined to the upper ends of said spaced arm.

3. A carrier for a milk bottle having a neck provided with an upper bead, said carrier comprising a ring adapted to loosely encircle the neck of the bottle, a pair of resilient gripping members having spaced inner or outer arms, said members being pivotally mounted upon said ring, the inner of such arms being cutout to conform to the neck of a bottle and engage said neck below said bead, and the outer of such arms being provided with apertures, and a stiff U-shaped handle having its ends pivotally joined to the apertured ends of the outer arm.

In testimony that I claim the foregoing I have hereunto set my hand at Manitowoc, in the county of Manitowoc and State of Wisconsin.

GEORGE W. UVARY.